UNITED STATES PATENT OFFICE.

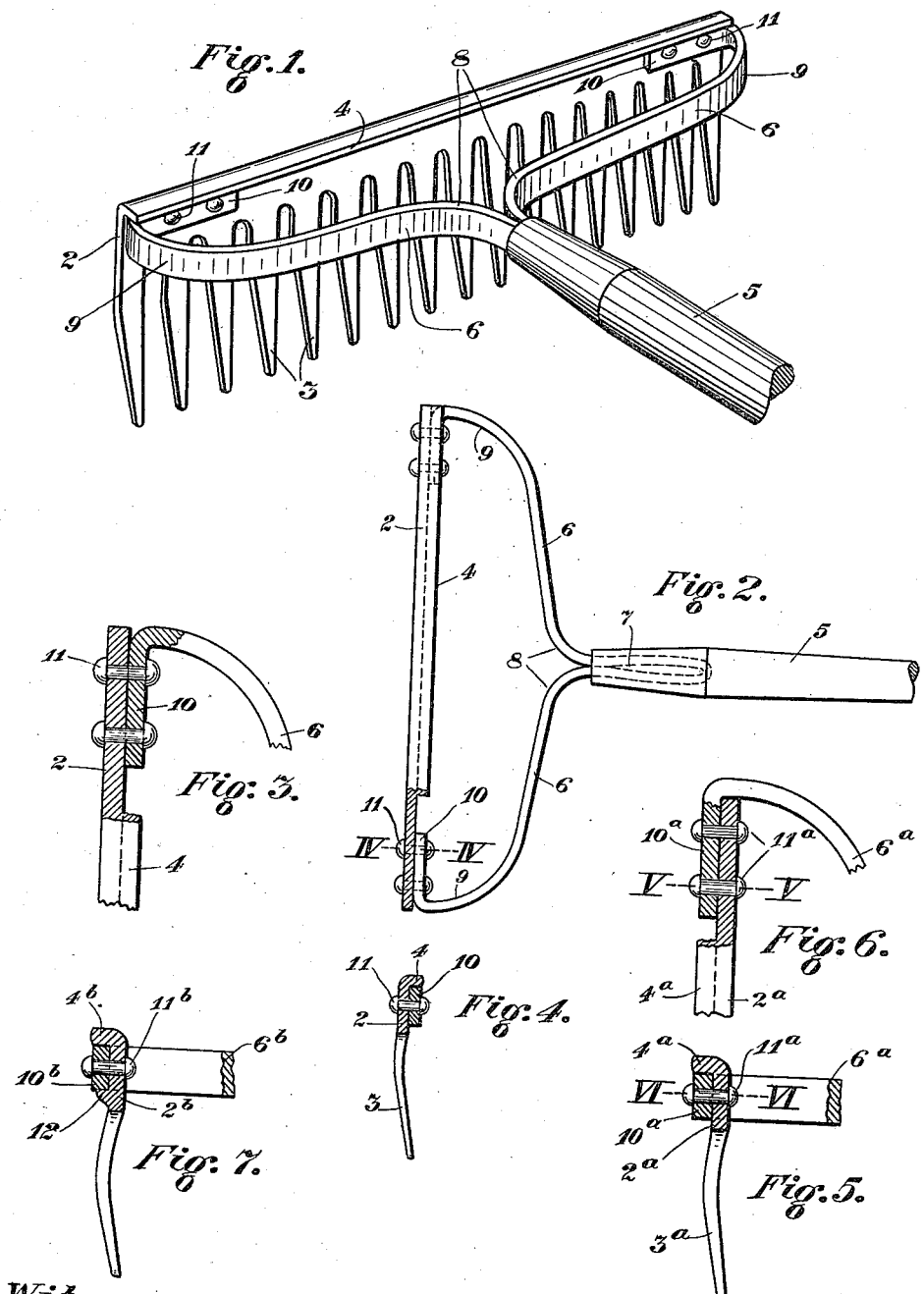

EDWARD G. CRONK, OF MONTOUR FALLS, NEW YORK, ASSIGNOR TO THE CRONK & CARRIER MANUFACTURING COMPANY, OF ELMIRA, NEW YORK, A CORPORATION OF NEW YORK.

RAKE.

1,045,263.  Specification of Letters Patent.  Patented Nov. 26, 1912.

Application filed December 11, 1911. Serial No. 665,107.

*To all whom it may concern:*

Be it known that I, EDWARD G. CRONK, a citizen of the United States, residing at Montour Falls, in the county of Schuyler and State of New York, have invented certain new and useful Improvements in Rakes, of which the following is a specification.

My invention consists of an improvement in garden and other rakes, and has for its object to provide a strong, durable tool of this class, made entirely of high carbon wrought steel or other available metal, and having a suitable handle.

The feature of improvement is in the connection, between the handle and the rake head, of a double bowed arm, having a socketed or other suitable connection with the handle and connected by its terminals with the head of the rake, said head having a reinforcing co-acting flange.

The invention is illustrated in the accompanying drawings, in which—

Figure 1 is a perspective view of the rake. Fig. 2 is a plan view from above. Fig. 3 is a partial sectional detail view, showing the joint between one of the bow arms and the head. Fig. 4 is a cross section on the line IV. IV. of Fig. 2. Fig. 5 is a similar view, showing a modified arrangement, with the terminal of the bow arm embracing the front of the head. Fig. 6 is a cross section on the line VI. VI. of Fig. 5. Fig. 7 is a similar section showing a further modification.

The head of the rake is preferably punched or sheared out of sheet or plate metal, and is provided with a continuous transverse head or body portion 2, teeth 3 and an integral top flange 4 bent at right angles to the head, either backwardly or forwardly. In the principal figures of the drawing the flange 4 is disposed backwardly, but with either arrangement, the flange strongly reinforces and stiffens the entire head against bending strains.

The rake head is connected with the handle 5 by a pair of bowed arms 6 which may conveniently be of one continuous piece, and socketed in the handle 5 by a doubled middle extension, as indicated at 7, Fig. 2. In this respect the construction is similar to that shown in my prior Patent No. 774,980, of Nov. 15, 1904. Said arms, or the pieces of which they are formed, are of flat bar form comparatively thin, and of substantial depth, utilizing the stiffening power of a truss, the deepest cross section being so disposed as to resist the strains incident to the use of the tool.

Beyond the handle socket or joint each arm 6 is bowed outwardly as indicated at 8 toward the ends of the rake, extended at a suitable inclination for any desired distance, depending on the size of the rake, and then bowed around, as shown at 9 to bring the terminals, with an ample bowed curvature, to a connecting position with the ends of the rake head, at about right angles thereto.

The arms 6 are each provided with inwardly turned attaching portions 10, laid against the face of the end portions of the head 2, and secured thereto by rivets or bolts 11. As shown in Figs. 1 to 4 inclusive, the attaching terminals 10 are seated snugly underneath the backwardly turned flange 4, and then secured by the rivets, so that the flange is thus held in positive bearing engagement with the arm terminals. As shown, the terminals 10 extend inwardly from the ends of the head 2 for a considerable distance, thereby greatly reinforcing the entire structure.

If desired, the flange of the head may be disposed forwardly, as indicated at $4^a$, Figs. 5 and 6, and in such case the arm terminals $10^a$ are also brought around in front of the head, underneath the flange, and secured by the rivets $11^a$. I may also further reinforce and brace the joint by providing under lips 12, extending from the rake head, as indicated in Fig. 7, the terminals $10^b$ being seated between the top flange $4^b$ and said lips, and fixedly secured by the rivets $11^b$, as will be clearly understood. With either construction the joint is rendered strong and substantial, and the entire construction greatly stiffened and reinforced.

The advantages of the invention will be appreciated by all those familiar with this class of implements. The bow arms, by their attachment with the ends of the rake head in the manner shown and described render the rake easily available for use, with a maximum of strength and a minimum of weight.

What I claim is:

1. A rake comprising a head, a handle, and supporting arms therefor consisting of a single bar having a middle doubled tang extension fixedly secured in the handle providing arms diverging in opposite directions therefrom and reversely bowed at their outer portions and provided with inwardly turned terminals fixedly secured along the face of the upper end portions of the head.

2. A rake comprising a head provided with a top flange, a handle, and a centrally supported bowed frame diverging from the handle having its ends turned inwardly and connected with the ends of the rake head.

3. The combination of a rake head having a top flange, a handle, and a frame connecting the handle and head provided with inwardly turned terminals secured to the ends of the rake head beneath said flange.

4. The combination of a rake head having a top flange, and a supporting frame therefor consisting of a flat bowed bar having inwardly turned attaching terminals secured to the ends of the rake head and engaging said flange.

5. In a rake, the combination of a handle, a bowed frame consisting of a flat bar fixedly secured in the end of the handle, diverging therefrom in opposite directions and bent around to provide rounded portions having inwardly turned terminals, and a rake head having a longitudinal top flange and riveted to said terminals, substantially as set forth.

6. In a rake, the combination of a handle, a bowed frame consisting of a flat bar fixedly secured in the end of the handle, diverging therefrom in opposite directions and bent around to provide rounded portions having inwardly turned terminals, a rake head of wrought metal having a longitudinal top flange bent over the top edges of said terminals, and rivets securing the frame terminals in connected engagement with the rake head and flanges, substantially as set forth.

7. In a rake, the combination of a rake head having teeth, a top flange, and projecting lugs; a handle; and a bowed frame consisting of a flat metallic bar secured to the handle at its middle portion, bowed at each side thereof, and bent inwardly at each end into engagement with the rake head, flange and lugs; and securing rivets therefor, substantially as set forth.

In testimony whereof I hereunto affix my signature in the presence of two witnesses.

EDWARD G. CRONK.

Witnesses:
J. E. La Tourrette,
W. D. Bowlby.

Copies of this patent may be obtained for five cents each, by addressing the "Commissioner of Patents, Washington, D. C."